US006567095B2

United States Patent
Wood

(10) Patent No.: US 6,567,095 B2
(45) Date of Patent: *May 20, 2003

(54) THREE-DIMENSIONAL IMAGE TEXTURE MAPPING

(75) Inventor: Karl J. Wood, Crawley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 09/928,760

(22) Filed: Aug. 13, 2001

(65) Prior Publication Data

US 2002/0027559 A1 Mar. 7, 2002

Related U.S. Application Data

(63) Continuation of application No. 08/870,106, filed on Jun. 5, 1997, now Pat. No. 6,295,070.

(30) Foreign Application Priority Data

Jun. 7, 1996 (GB) ............................................. 9611941

(51) Int. Cl.$^7$ ................................................. G09G 5/00
(52) U.S. Cl. .................................................... 345/587
(58) Field of Search ................................. 345/419, 581, 345/582, 587, 589, 592, 606; 382/285

(56) References Cited

U.S. PATENT DOCUMENTS

5,495,563 A * 2/1996 Winser ........................ 345/582
5,668,940 A * 9/1997 Steiner et al. ............... 345/592
5,719,599 A * 2/1998 Yang ........................... 345/587

FOREIGN PATENT DOCUMENTS

GB    WO 96/14621    * 5/1996    ............ G06I/15/00

OTHER PUBLICATIONS

Foley et al, Computer Graphics: principles and Practice: second edition in C, 1996; section 17.4.3, chapter 18.*

* cited by examiner

Primary Examiner—Mano Padmanabhan
(74) Attorney, Agent, or Firm—Gregory L. Thorne

(57) ABSTRACT

A circuit arrangement and display apparatus are described for use in 3-D graphics, where 2-D texture mass stored at different resolutions in a pyramidal array are indexed by a pair of texture coordinates and an associated level coordinate (L). In order to introduce depth cues to the 2-D transformed image of the 3-D environment, a focus depth (F) for the image is specified and those image components having a depth (z) other than the focus depth have their texture blurred to direct the viewer's eye to the depth of interest. The texture blurring is introduced by applying an offset (FS) to the level coordinate (L) indexing the pyramidal array in an amount determined by the distance to the focus depth.

13 Claims, 3 Drawing Sheets

THREE-DIMENSIONAL IMAGE TEXTURE MAPPING

This application is a continuation of application Ser. No. 08/870,106, filed Jun. 5, 1997, now U.S. Pat. No. 6,295,070.

FIELD OF THE INVENTION

The present invention relates to a circuit arrangement for modifying pyramidal texture coordinates for three-dimensional (3-D) graphics applications and also to a display apparatus including or being driven by such a circuit arrangement, particularly but not exclusively a stereoscopic or multiple view display apparatus.

BACKGROUND OF THE INVENTION

An example of such a circuit arrangement and its use in a single view (non-stereoscopic) display apparatus is described in our European patent application EP-A-0 438 195 which provides a circuit arrangement for converting pyramidal texture coordinates into corresponding physical texture memory addresses in an electronic display apparatus. The circuit arrangement comprises a pyramidal coordinate input for receiving a two-dimensional (2-D) coordinate pair and an associated level coordinate, together with means for generating from the received coordinate pair and level coordinate a corresponding physical texture memory address. The texture memory holds a pyramidal or part pyramidal array of texture element ("texel") values representing a 2-D modulation pattern (the texture) to be mapped onto surface primitives, with each level of the pyramid holding a 2-D version of the pattern filtered to a different level of resolution. Suitable filtering methods for the generation and storage of pyramidal texture arrays are described in a paper entitled "Pyramidal Parametrics" by Lance Williams, Computer Graphics, Volume 17, No 3 (July 1983) at pages 1 to 11.

EP-A-0 438 195 is concerned with an arrangement for translating texture map addressing to allow for efficient storage of part-pyramidal arrays in a linearly addressed (one-dimensional) texture memory, with a simple offset mechanism enabling rapid indexing between corresponding areas of maps of differing resolutions.

Most 3-D graphics systems can produce auxiliary information for each pixel in the rendered image, in addition to the color and intensity, such as the depth of the nearest surface impacting each pixel as is commonly available from a z-buffer. Given depth information for the nearest surface impacting each pixel, it is possible to blur the rendered image by filtering such that the amount of blurring increases as a function of the difference between the depth associated with the pixel and some programmable depth value corresponding to a point of interest. The effect mimics what happens in the cinema when a camera focuses on a point of interest and other parts of the scene are blurred. Previously, however, systems such as that of EP-A-0 438 195 have required the blurring effect to be applied as a further processing step to the rendered and texture mapped image.

SUMMARY OF THE INVENTION

It is therefore an object of the present invention to provide a relatively simple mechanism which enables focus/de-focus effects to be incorporated during rendering and texture mapping of an image.

In accordance with a first aspect of the present invention there is provided a circuit arrangement for modifying pyramidal texture coordinates for three-dimensional (3-D) graphics applications, the arrangement comprising: a pyramidal coordinate input for receiving a two-dimensional (2-D) texture coordinate pair and an associated level coordinate; and means operable to generate a physical texture memory address based on the received 2-D texture coordinate pair and associated level coordinate, said means being arranged to generate an offset to said associated level coordinate, and to generate said physical texture-memory address from the received coordinate pair and the sum of the associated level coordinate and generated offset thereto: characterised in that said circuit arrangement further comprises an input for receiving a focal depth value, and said means operable to generate a physical texture memory address is arranged to generate said offset having a magnitude determined by the received focal depth value.

This arrangement can be applied in apparatus for the generation of images to be displayed on a conventional display such as a monitor or projection system, but is of particular interest for stereoscopic displays such as autostereoscopic screens or Virtual Reality binocular headsets as the stereo effect is reinforced by the depth cueing provided by de-focusing the texture.

In the circuit arrangement, the offset is suitably generated per pixel of an image and the focal depth value consequently specifies a relative depth difference between a depth value for the image and a depth value for each pixel. A limiter stage may be provided coupled with the texture memory address generator, the limiter acting to maintain the said sum of the associated level coordinate and generated offset thereto within a predetermined range of values.

In accordance with a further aspect of the present invention, there is provided a display apparatus comprising a host processor with associated main memory for the storage of object primitive data and texture definitions and a first display processor with associated display memory and texture memory, the host processor comprising: means for storing in the texture memory at least one pyramidal or part-pyramidal array of texel values comprising a plurality of 2-D arrays of texel values representing a given 2-D modulation pattern at at least two levels of resolution defined by respective values of a level coordinate; and means for supplying object primitive data to the first display processor, including an indication that a pattern of modulation is to be applied to the object primitive in accordance with texel values stored in the pyramidal array in the texture memory; the first display processor comprising: means for generating from the object primitive data a series of pixel addresses for application to the display memory and a corresponding series of 2-D texture coordinate pairs each with an associated level coordinate, to effect a mapping of the stored modulation pattern onto the object primitive at a level or levels of resolution defined by the associated level coordinate; and means operable to generate an offset to each said associated level coordinate, and to generate said texture memory addresses from the received coordinate pair and the sum of the associated level coordinate and generated offset thereto; characterised in that the display processor further comprises an input for receiving a focal depth value, and said means operable to generate said offsets is arranged to generate said offsets having a respective magnitude determined by the received focal depth value.

The display apparatus may further comprise a second display processor with associated display memory, the second display processor being coupled to receive the object primitive data from the host processor and comprising means for applying at least one of a horizontal and a vertical offset to the received object primitive data, means for generating from the offset primitive data a series of pixel addresses for application to the display memory. By the application of the offset, the second image of a stereoscopic pair may be provided. Where provided, the second display processor may have an associated texture memory corresponding to that of the above-mentioned first display processor, together with a respective input for receiving the focal depth value and means operable to generate said offsets. Depending on the application of the display apparatus, user operable input means may be provided coupled to the host processor, with the processor arranged to generate and vary the focal depth value in dependence on signals from the input means and output the focal depth value to the or each display processor.

In accordance with a still further aspect of the present invention, there is provided a multi-view display apparatus comprising a number of display apparatuses as described above, the display memories of which supply images to respective views of a multi-view lenticular array screen. The central views of the horizontally displaced series of viewpoints provided by the lenticular array are driven by the above-described first display processors, and the outer views being driven by the respective ones of the second display processors. In other words, the central images are each generated by a respective rendering stage whilst those towards the edge are of lower quality, being generated by post-processing techniques.

BRIEF DESCRIPTION OF THE DRAWINGS

Further features and advantages of the present invention will become apparent from reading of the following description of preferred embodiments of the present invention, given by way of example only, and with reference to the accompanying drawings, in which.

DETAILED DESCRIPTION OF THE INVENTION

Figure 1:
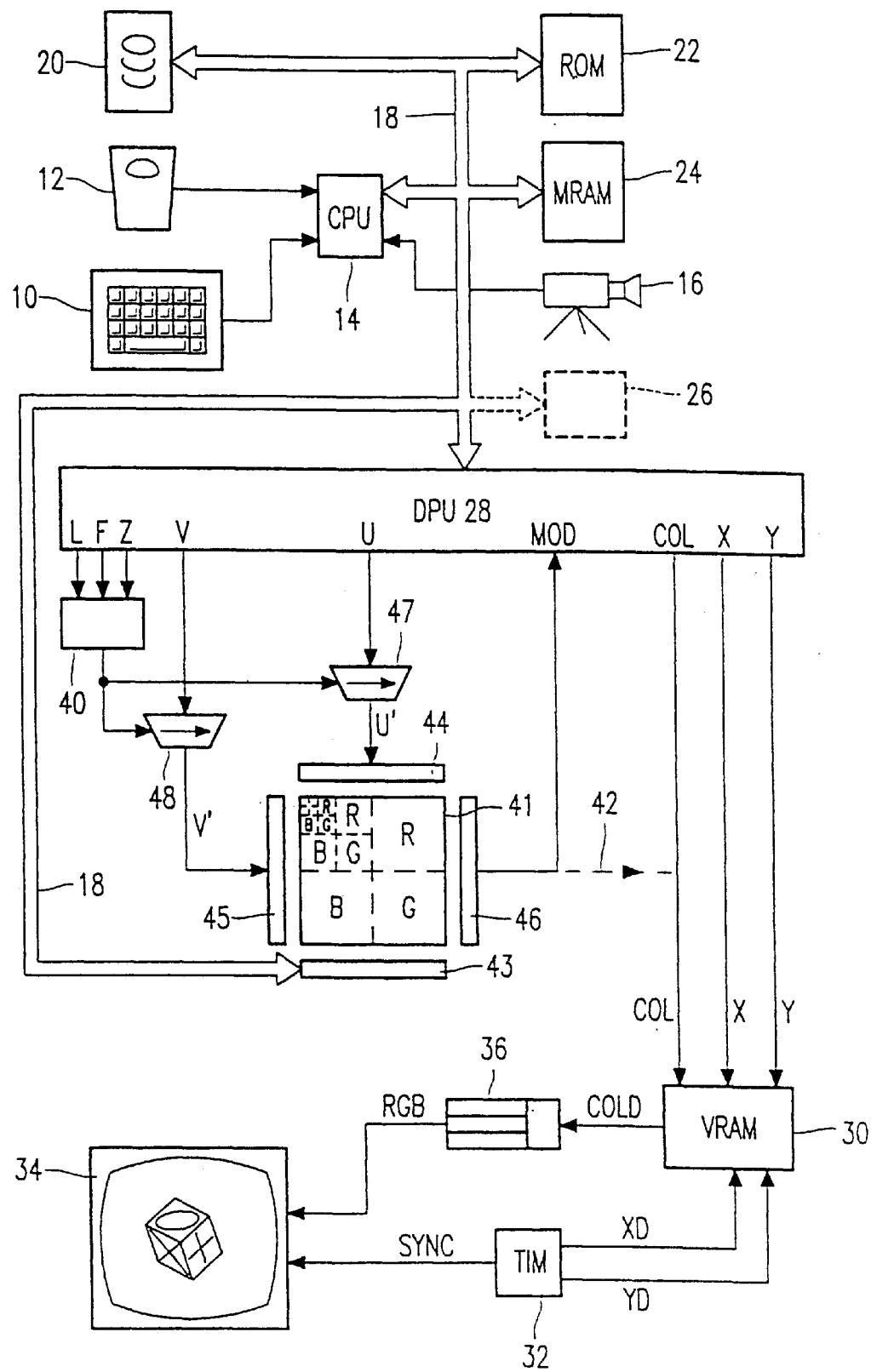
FIG. 1 is a block diagram of a display apparatus including texture mapping hardware embodying the present invention.

Beginning with the application of the present invention in the generation of a conventional (i.e. non-stereoscopic) image, FIG. 1 is a block diagram of a display apparatus including texture mapping hardware. A keyboard 10 and a trackball input device 12 provide input from a user to a central processing unit (CPU) 14. The trackball may be used for designing 3-D objects to be manipulated by the system, in a known manner. Other input devices may also be used, of course, such as a joystick, digitising tablet, or a mouse. Objects and also photographic images to be applied to object surfaces by texture mapping may also be input from a video source such as a camera 16.

The CPU 14 is connected via a bus 18 to a disc store 20, a ROM 22 and a main memory (MRAM) 24. The disc store, which may include magnetic floppy discs, hard discs, and/or optical memory discs, is used for storing data (for example images or 3-D model data) which can then be recalled and manipulated to generate new images as desired. Such data may include the user's work from previous input sessions and/or commercially generated data, for example for use in interactive computer-aided design or computer simulations for education or entertainment. To allow modelling of 3-D objects, such data will generally be stored as polygonal model data rather than in the form of two-dimensional images. In that case, the data corresponds to a 3-D model containing objects which are typically broken down into groups of polygonal surfaces (primitives) in a 3-D "object" space. The data for each object in the model comprises a list giving the position and nature of every polygon that goes to make up the object, including the relative positions of its vertices and the color or transparency of the polygon surface. In other systems, primitives may comprise curved surface patches, as is known in the art. It is known that a texture can be specified for mapping onto the surface, so that detail can be represented without increasing the number of primitives that make up the scene. A texture map is a stored 2-D array of texture element (texel) values defining a 2-D pattern of modulation that may for example define the color of pixels (in a manner to be described below), or may modulate other quantities such as reflectance or surface normal direction. These texture maps may also be stored in the disc store 20 and recalled as required.

The CPU 14 and the other components of the system then translate the 3-D model "world" in object space into a first two-dimensional view for the user (in "viewer" space), from a first viewpoint which may be determined by the application or may be controlled by a user. As will be described below, a further view may additionally be generated by post-processing, with the first and second views forming a stereo pair for display on an autostereoscopic display screen or a VR-type head-mounted display.

The translation is effected by means of geometric transformations effecting translations, rotations and perspective projections, generally by means of matrix multiplication of vertex coordinates, and the CPU 14 may also perform clipping and lighting calculations on a per-primitive or per-vertex basis. The ROM 22 and MRAM 24 provide program memory and workspace for the CPU 14, and special processing hardware 26 may be provided to assist the CPU 14 to perform the large number of arithmetic operations required to convert all but the simplest models into a two-dimensional scene. The hardware 26 may comprise standard arithmetic circuits or it may include more powerful custom-built or programmable digital signal processing integrated circuits and may be connected to the CPU 14 via bus 18. The nature of the hardware 26 will depend on the requirements of the system, for example with respect to speed, resolution, number of primitives per scene, etc.

A display processing unit (DPU) 28 is connected between outputs of the CPU 14 (via the bus 18) and inputs of a display memory (VRAM) 30. The display memory 30 stores pixel data COL in raster-scan format. The pixel data COL might typically include for each pixel three 8-bit values (total 24 bits) corresponding to red (R) green (G) and blue (B) components of the desired image. Those skilled in the art will appreciate that in other embodiments fewer or more bits may be provided for, or the bits might define the color in terms of different components (e.g. YUV).

In the DPU 28 the primitives are "scan converted" so that they may be drawn into the display memory 30. Scan conversion is a process whereby the pixels covered by each primitive are written row by row and pixel by pixel, in the same way that the complete image will be scanned for output to the display.

A timing unit (video controller) 32 generates read-address signals XD and YD to address the pixel data within the VRAM 30 synchronously with the raster-scanning of a display screen 34. In response to these address signals, the locations in the VRAM 30 are scanned row by row and column by column to read color values COLD which are fed to a digital to analogue converter 36. If a non-RGB color code is used, a matrix circuit or color look-up table may be provided to translate the pixel data COLD into the equivalent RGB signal for supply to the display screen 34, which may for example be a cathode-ray tube display screen, and which also receives timing signals (SYNC) from the timing unit 32. As will be readily understood, the form and/or operation of components 30,32,36 may vary for different display devices, for example LCD screens.

To draw or "render" a primitive, the CPU 14 (or the special hardware 26) causes registers within the DPU 28 to be loaded, via the bus 18, with values defining a single primitive (for example in terms of vertex coordinates, edge slope and so on) and its various attributes—color, reflectance and so forth. The DPU 28 then generates pixel coordinates (X and Y) so as to scan systematically the entire area covered by the primitive. The pixel coordinates X and Y are applied as write addresses to the VRAM 30, so that a pixel value COL can be written into the VRAM 30 for every pixel.

The pixel values COL are generated so that a basic surface color of the primitive is modulated to account realistically for attributes of an object's surface (for example transparency, diffuse reflectance, specular reflectance) and of the 3-D environment (for example locations and shapes of light sources). Some of this modulation can be generated arithmetically from parameters loaded with the primitive data, for example to produce smoothly varying shading to simulate a curved surface. However, to provide more detailed modulation, and to facilitate the introduction of depth cueing to the image, mapping hardware is provided to supply modulation values MOD based on a predetermined pattern stored in advance in a texture memory 41.

To this end, the DPU 28 generates a pair of texture coordinates U and V simultaneously with each pair of pixel (display) coordinates X and Y so that the modulation pattern is mapped onto the primitive surface, implementing geometric transformations (i) from texture space into object space and (ii) from object space into viewer (display) space.

The texture coordinates U and V are processed within the mapping hardware in a manner to be described below and applied to the texture memory 41 so that a modulation value MOD is available for each pixel location X,Y being addressed. The value MOD commonly comprises a color value, and in principle it could directly form the pixel value COL and be fed directly into the display memory (VRAM) 30, as shown by the dotted data path 42. More commonly, however, even if the values MOD are color values, they will require to be modified within the DPU 28 to allow for realistic lighting effects. In a more general case, the modulation values MOD are used within the DPU 28 together with other parameters to modify the pixel values COL less directly.

The texels represented in the texture memory 41 will not in general correspond on a one-to-one basis with the pixels of the display and, in particular when the primitive is shown in the distance and the texture is consequently mapped onto a very small number of pixels, two-dimensional spatial filtering is required to avoid the aliasing effects that would occur if simple sub-sampling were used.

It is known that a generalised filter cannot be applied economically in an apparatus where real-time moving images are to be synthesised, and the above-mentioned reference by Williams describes the conventional solution to this which is to store several 2-D arrays (hereinafter referred to as "maps") for a given pattern, each being successively smaller and pre-filtered to a successively lower resolution. The DPU 28 then need only produce a level coordinate L to determine the appropriate map to use. For compact storage and for high speed access to the texel values, the maps may be chosen to be square, having power-of-two dimensions, and be stored in a square texture memory according to the "multum in parvo" ("MIP map") technique described by Williams.

FIG. 1 shows within the texture memory 41 the color components R, G and B of a texture pyramid stored as a MIP map. The largest (highest resolution) map (L=0) may for example comprise 512×512 texels, the L=1 maps comprise 256×256 texels and so on down to L=9 where each map becomes a single texel. Assuming, for the sake of example, that each texel value comprises an 8-bit value for each of the R, G and B color components, the entire texture memory 41 is thus 1 Mbyte in size.

The texel values are stored in the memory 41 in advance of rendering by the CPU 14 via the bus 18 and a writing port 43 of the memory 41. For each texel value to be read, the DPU 28 generates a 2-D coordinate pair, each coordinate (U and V) of which includes at least an integer part 9bits in length. At the same time, the level coordinate L is generated by the DPU 28 and, subject to modification by a depth cue circuit 40, is used to generate physical coordinates U' and V' from the "virtual" coordinates U and V for application to read address ports 44 and 45 respectively of the texture memory 41. In response to each physical coordinate pair U', V' the memory 41 releases the R, G and B components of an addressed texel via a (24-bit) read port 46.

Because of the two-dimensional binary tree arrangement of the MIP maps in the memory 41, the required physical coordinates U' and V' can be generated simply by a pair of binary shifting circuits 47 and 48 respectively, each right-shifting the respective coordinate a number of places defined by the level coordinate L. In particular, if L=0 represents the highest level, then the address corresponding to a given texel in the level 0 map can be converted to the physical address of the corresponding texel in the level L map can be found by right-shifting the U and V coordinates L places, effectively scaling-down each coordinate by 2L. The unmodified level coordinate L can be supplied to the DPU 28 as part of the primitive data, but if perspective is to be accounted for in the mapping, then the level coordinate L will more probably be generated within the DPU on a per-pixel basis.

Figure 2:
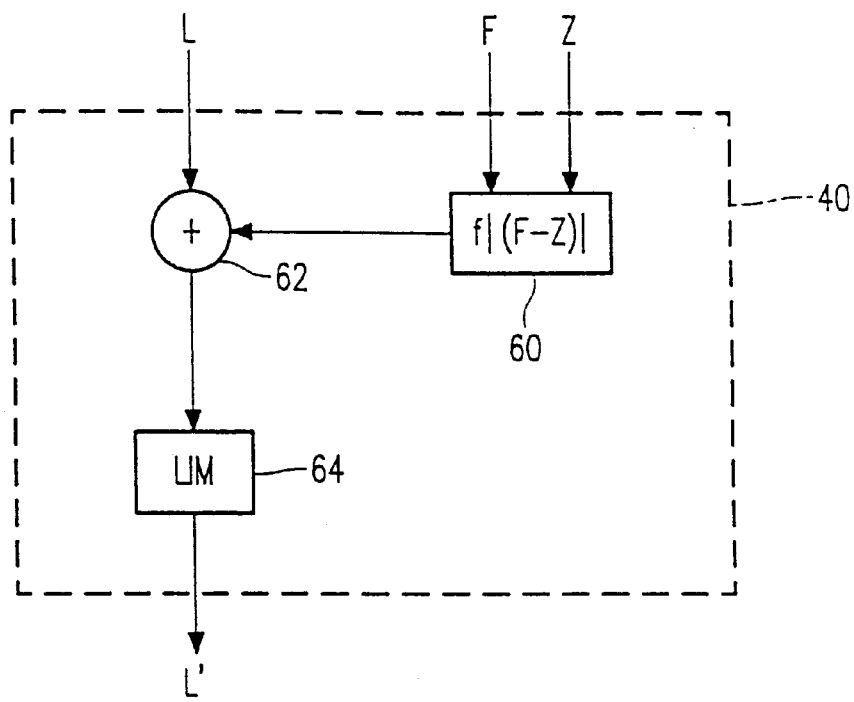
FIG. 2 schematically illustrates the depth cue circuit arrangement of the mapping hardware of FIG. 1.

The depth cue circuit 40 is shown in FIG. 1 as a separate unit coupled to the DPU 28 although, as will become apparent, its functions may equally be performed in software within the DPU. As shown schematically in FIG. 2, the circuit 40 has inputs for the unmodified level coordinate L, a focus depth F and a pixel depth z. The focus depth F specifies that apparent depth within the 2-D display image at which the viewer is intended to focus. The value of F may be fixed, or may be variable under control of the application or in response to user input, as required by the particular application. The pixel depth is supplied for each pixel in the displayed image, in synchronism with the generated display coordinates X and Y and is generated by the DPU 28 during the translation of the 3-D world model to the 2-D display image.

Figure 3:
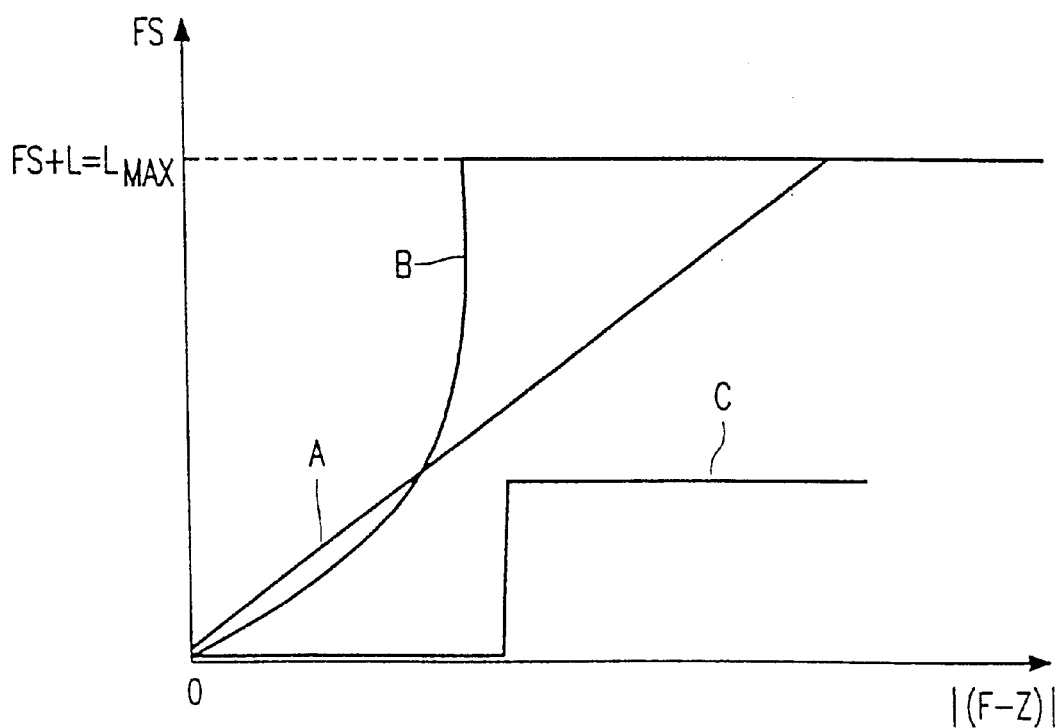
FIG. 3 represents different depth cueing characteristics which may be applied by the circuit of FIG. 2.

An arithmetic stage 60 generates an output value FS as a function of the separation between the pixel depth and focus depth which value is added to the unmodified level coordinate L at summation circuit 62 to produce a modified coordinate level L'. A limiter stage 64 is suitably provided on the output of the summation circuit to ensure that the modified coordinate L' is within the range of levels supported by the texture memory 41. The particular function applied by arithmetic circuit 60 may vary depending on the desired depth cue characteristic, as shown by examples A, B and C in the graph of FS against separation (F-z) in FIG. 3. The common feature is that for pixel depths at or close to the focus depth F the value of FS is zero such that L'=L and those pixels have the "appropriate" texture resolution whilst the texture is blurred at other depths.

Where the mapping hardware includes interpolators (not shown) for generating texture values by interpolating between two map levels of the pyramidal data structure, non-integer values of L' may be allowed, as shown by examples A and B (which also show the effect of the limiter stage 64 when the maximum value of L for the texture memory is reached). Where only integer values of L (and hence L') are supported, FS is similarly constrained to be an integer value as shown by example C.

As previously mentioned, whilst the present invention is applicable to generation of conventional (non-stereoscopic) images, it is of particular benefit for stereoscopic applications where the stereo effect is reinforced by the depth cueing. Stereoscopy in 3-D graphics refers to techniques for delivering different but correlated images to the left and right eyes in order to stimulate the perception of depth.

It is accepted that driving the two channels of a stereoscopic display from two 3-D graphics renderers, one per eye viewpoint (each as in FIG. 1), is in principle better than attempting to synthesise two images using one 3-D graphics renderer. Advantages are as regards image quality and in potential for avoiding fatigue and nausea related side effects, against which is the cost of duplicating the renderers. In the cheaper technique of synthetic stereoscopy, an image may be rendered for the left eye and that for the right eye image be synthesised by post processing. Given that the post processing is relatively simple, the incremental cost is less than that of providing a second 3-D graphics renderer.

Figure 4:
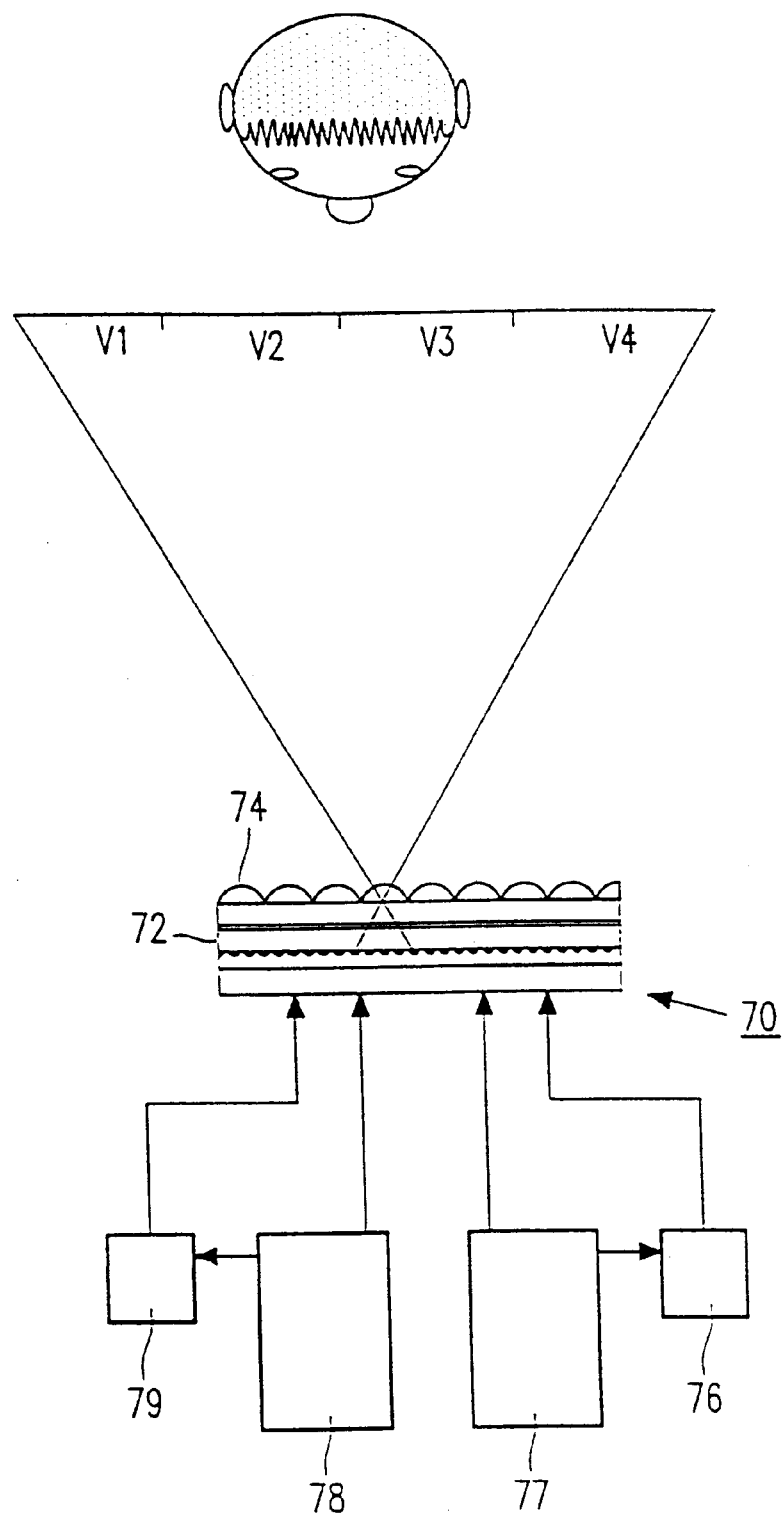
FIG. 4 schematically illustrates a multiple view display device arrangement which may suitably utilise the present invention.

A suitable stereoscopic application for the present invention is shown in FIG. 4, where a four-view screen 70 is provided: the screen is an LCD device 72 with an overlying lenticular screen 74 with the arrangement of pixels driven from four different sources 76–79 relative to the individual lenticular arrays being such that, at viewing locations V1 to V4, the images from respective ones of the four sources 76–79 can be seen. A four view display of this type is described in a paper entitled "Multiview 3D-LCD" by Cees van Berkel et al, presented at IS&T/SPIE International Conference on Electronic Imaging, San Jose, 27/1–2/2 1996.

It is expected that the main viewer of such a multiple view display will be positioned in the center of the display as shown, typically being involved in some interactive role, and as such will only see a stereoscopic image provided by the two central views. Other viewers, typically in some passive role, may be positioned off center. To provide an optimum combination of quality and cost, the image sources 77,78 for the two center views V2,V3 are respective 3-D graphics renderers as in FIG. 1, and the other views, image sources 76,79 are merely post-processing stages coupled to respective ones of the renderers 77,78 and generating views by synthetic stereo. Thus the main viewer has the best seat while viewers to the side suffer some degradation. Where more than four views are supported by the display, the arrangement may be extended with a hybrid of multiple 3-D graphics renderers and multiple synthetic stereo processors driving such multiple view displays in a cost effective but high quality manner, such that higher quality is available towards the central viewing position, or at predetermined principal viewing positions.

In summary, we have described a circuit arrangement and display apparatus for use in 3-D graphics, where 2-D texture maps stored at different resolutions in a pyramidal array are indexed by a pair of texture coordinates and an associated level coordinate. In order to introduce depth cues to the 2-D transformed image of the 3-D environment, a focus depth for the image is specified and those image components having a depth other than the focus depth have their texture blurred to direct the viewer's eye to the depth of interest. The texture blurring is introduced by applying an offset to the level coordinate indexing the pyramidal array in an amount determined by the distance to the focus depth.

From reading the present disclosure, other modifications will be apparent to persons skilled in the art. Such modifications may involve other features which are already known in the field of autostereoscopic display apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A circuit arrangement for modifying pyramidal texture coordinates for three-dimensional (3-D) graphics applications, the arrangement comprising:

a pyramidal coordinate input for receiving a two-dimensional (2-D) texture coordinate pair and an associated level coordinate; and means operable to generate a physical texture memory address based on the received 2-D texture coordinate pair and associated level coordinate, said means being arranged to generate an offset to said associated level coordinate, and to generate said physical texture memory address from the received coordinate pair and the sum of the associated level coordinate and generated offset thereto;

characterised in that said circuit arrangement further comprises an input for receiving a focal depth value, and said means operable to generate a physical texture memory address is arranged to generate said offset having a magnitude determined by the received focal depth value, whereby the physical texture memory address is partly determined by the associated level coordinate and the focal depth value.

2. The program portion of claim 1, wherein said offset is generated per pixel of an image and said focal depth value specifies a relative depth difference between a depth value for said image and a depth value for each said pixel forming a part of said image.

3. The program portion of claim 1, comprising a program segment arranged to maintain said sum of said associated level coordinate and said generated offset within a predetermined range of values.

4. The program portion of claim 1, wherein said physical texture memory address is a first physical texture memory address, said program portion comprising a program segment for generating a second physical texture memory address from at least one of a horizontal and a vertical offset to the received 2-D texture coordinate pair, wherein said program portion retrieves pixel elements generated from said first and second physical texture memory address for supplying to respective views of a lenticular array screen.

5. The program portion of claim 4, wherein the lenticular array screen is a 2(N+1) view lenticular array screen and wherein said program segments for generating said first and second physical texture memory addresses respectively generate first and second (N+1) physical texture memory addresses each for retrieving (N+1) pixel elements for respective views of the 2(N+1) view lenticular array screen, with the respective pixels being visible at 2(N+1) horizontally displaced viewpoints in front of the screen, the (N+1) central views of the horizontally displaced series being driven by the first (N+1) pixel elements, and the outer views being driven by the second (N+1) pixel elements, where N is an integer and N=(1,2,3 . . . etc.).

6. A circuit arrangement for modifying pyramidal texture coordinates for three-dimensional (3-D) graphics applications, the arrangement comprising:

a pyramidal coordinate input for receiving a two-dimensional (2-D) texture coordinate pair and an associated level coordinate; and means operable to generate a physical texture memory address based on the received 2-D texture coordinate pair and associated level coordinate, said means being arranged to generate an offset to said associated level coordinate, and to generate said physical texture memory address from the received coordinate pair and the sum of the associated level coordinate and generated offset thereto;

characterised in that said circuit arrangement further comprises an input for receiving a focal depth value, and said means operable to generate a physical texture memory address is arranged to generate said offset having a magnitude determined by the received focal depth value, whereby the physical texture memory address is partly determined by the associated level coordinate and the focal depth value.

7. A circuit arrangement as claimed in claim 6, wherein said offset is generated per pixel of an image and said focal depth value specifies a relative depth difference between a depth value for said image and a depth value for each said pixel forming a part of said image.

8. A circuit arrangement as claimed in claim 6, further comprising a limiter stage coupled with said means operable to generate a physical texture memory address and arranged to maintain the said sum of the associated level coordinate and generated offset thereto within a predetermined range of values.

9. A display apparatus comprising a host processor with associated main memory for the storage of object primitive data and texture definitions and a first display processor with associated display memory and texture memory, the host processor comprising:

means for storing in the texture memory at least one pyramidal or part-pyramidal array of texel values comprising a plurality of two-dimensional (2-D) arrays of texel values representing a given 2-D modulation pattern at at least two levels of resolution defined by respective values of a level coordinate; and means for supplying object primitive data to the first display processor, including an indication that a pattern of modulation is to be applied to the object primitive in accordance with texel values stored in the pyramidal array in the texture memory;

the first display processor comprising:

means for generating from the object primitive data a series of pixel addresses for application to the display memory and a corresponding series of 2-D texture coordinate pairs each with an associated level coordinate, to effect a mapping of the stored modulation pattern onto the object primitive at a level or levels of resolution defined by the associated level coordinate; and means operable to generate an offset to each said associated level coordinate, and to generate said texture memory addresses from the received coordinate pair and the sum of the associated level coordinate and generated offset thereto;

characterised in that the display processor further comprises an input for receiving a focal depth value, and said means operable to generate said offsets is arranged to generate said offsets having a respective magnitude determined by the received focal depth value, whereby said texture memory addresses are partly determined by said associated level coordinate and the received focal depth value.

10. A display apparatus as claimed in claim 9, further comprising a second display processor with associated display memory, the second display processor being coupled to receive said object primitive data from the host processor and comprising means for applying at least one of a horizontal and a vertical offset to the received object primitive data, means for generating from the offset primitive data a series of pixel addresses for application to the display memory.

11. A display apparatus as claimed in claim 10, wherein said second display processor has an associated texture memory corresponding to that of said first display processor, together with a respective input for receiving said focal depth value and means operable to generate said offsets.

12. A multi-view display apparatus comprising (N+1) display apparatuses according to claim 10, the display memories of which supply images to respective views of a 2(N+1) view lenticular array screen, with the respective images being visible at 2(N+1) horizontally displaced viewpoints in front of the screen, the (N+1) central views of the horizontally displaced series being driven by the (N+1) first display processors, and the outer views being driven by the respective ones of the second display processors, where N is an integer and N=(1,2,3 . . . etc.).

13. A display apparatus as claimed in claim 9, further comprising user operable input means coupled to said host processor, said host processor being arranged to generate and vary said focal depth value in dependence on signals from said input means and to output said focal depth value to the or each display processor.

* * * * *